United States Patent
Lee

(10) Patent No.: US 8,957,870 B2
(45) Date of Patent: Feb. 17, 2015

(54) NOISE FREQUENCY DETECTION METHOD AND TOUCH APPARATUS

(71) Applicant: AU Optronics Corp., Hsinchu (TW)

(72) Inventor: Ching-Min Lee, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 176 days.

(21) Appl. No.: 13/658,896

(22) Filed: Oct. 24, 2012

(65) Prior Publication Data

US 2014/0009408 A1    Jan. 9, 2014

(30) Foreign Application Priority Data

Jul. 6, 2012    (TW) ............................. 101124482 A

(51) Int. Cl.
*G06F 3/041*    (2006.01)

(52) U.S. Cl.
USPC .......................................................... 345/173

(58) Field of Classification Search
CPC ..................................................... G06F 3/041
USPC ......................................................... 345/173
See application file for complete search history.

(56) References Cited

U.S. PATENT DOCUMENTS

| 6,239,788 | B1 | 5/2001 | Nohno et al. | |
|---|---|---|---|---|
| 7,643,011 | B2 | 1/2010 | O'Connor et al. | |
| 2008/0040079 | A1 | 2/2008 | Hargreaves | |
| 2009/0095542 | A1 | 4/2009 | Moon et al. | |
| 2011/0057890 | A1* | 3/2011 | Goo et al. | 345/173 |
| 2012/0256638 | A1* | 10/2012 | Van Antwerpen et al. | 324/613 |
| 2013/0214798 | A1* | 8/2013 | Lee et al. | 324/676 |

FOREIGN PATENT DOCUMENTS

TW    I355629    1/2012

OTHER PUBLICATIONS

Taiwan Patent Office, "Office Action", Nov. 24, 2014.
China Patent Office, "Office Action", Dec. 11, 2014.

* cited by examiner

*Primary Examiner* — Long D Pham
(74) *Attorney, Agent, or Firm* — WPAT, PC; Justin King

(57) ABSTRACT

A noise frequency detection method includes steps of: providing a frequency of system clock; fixing an operation frequency band of a sensing signal; adjusting a pulse width of the sensing signal and sampling a noise, wherein each pulse width of the sensing signal corresponds to a noise value of the noise; and referring the pulse width corresponding to a preset value of the noise to as a critical value, and obtaining a noise frequency from dividing the frequency of system clock by the critical value. A touch apparatus is also provided.

18 Claims, 4 Drawing Sheets

NOISE FREQUENCY DETECTION METHOD AND TOUCH APPARATUS

TECHNICAL FIELD

The present disclosure relates to a touch technical field, and more particularly to a noise frequency detection method and a touch apparatus.

BACKGROUND

Conventionally, touch apparatus can suppress noise by obtaining noise values with different frequency bands through inputting sensing signals with different operation frequency bands, and referring the frequency band corresponding to the minimum noise to as the operation frequency band of the sensing signal.

However, noise cannot be suppressed efficiently by the touch apparatus designed with the aforementioned noise suppression features.

SUMMARY

An embodiment of the disclosure is to provide a noise frequency detection method, which includes: providing a frequency of system clock; fixing an operation frequency band of a sensing signal; adjusting a pulse width of the sensing signal and sampling a noise, wherein each pulse width of the sensing signal corresponds to a noise value of the noise; and referring the pulse width corresponding to a preset value of the noise to as a critical value, and obtaining a noise frequency from dividing the frequency of system clock by the critical value.

Another embodiment of the disclosure is to provide a touch apparatus, which includes a touch panel and a control circuit. The touch panel includes a plurality of driving lines and at least one sensing line. The control circuit is electrically connected to the touch panel and includes a driving unit, a sensing unit and a processing unit. The driving unit is electrically connected to the driving lines. The sensing unit is electrically connected to the sensing line(s). The processing unit, electrically connected to the driving unit and the sensing unit, is configured to obtain a sensing signal through the sensing unit and adjust the obtained sensing signal to have a pulse width equal to or multiple of a cycle of a noise.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
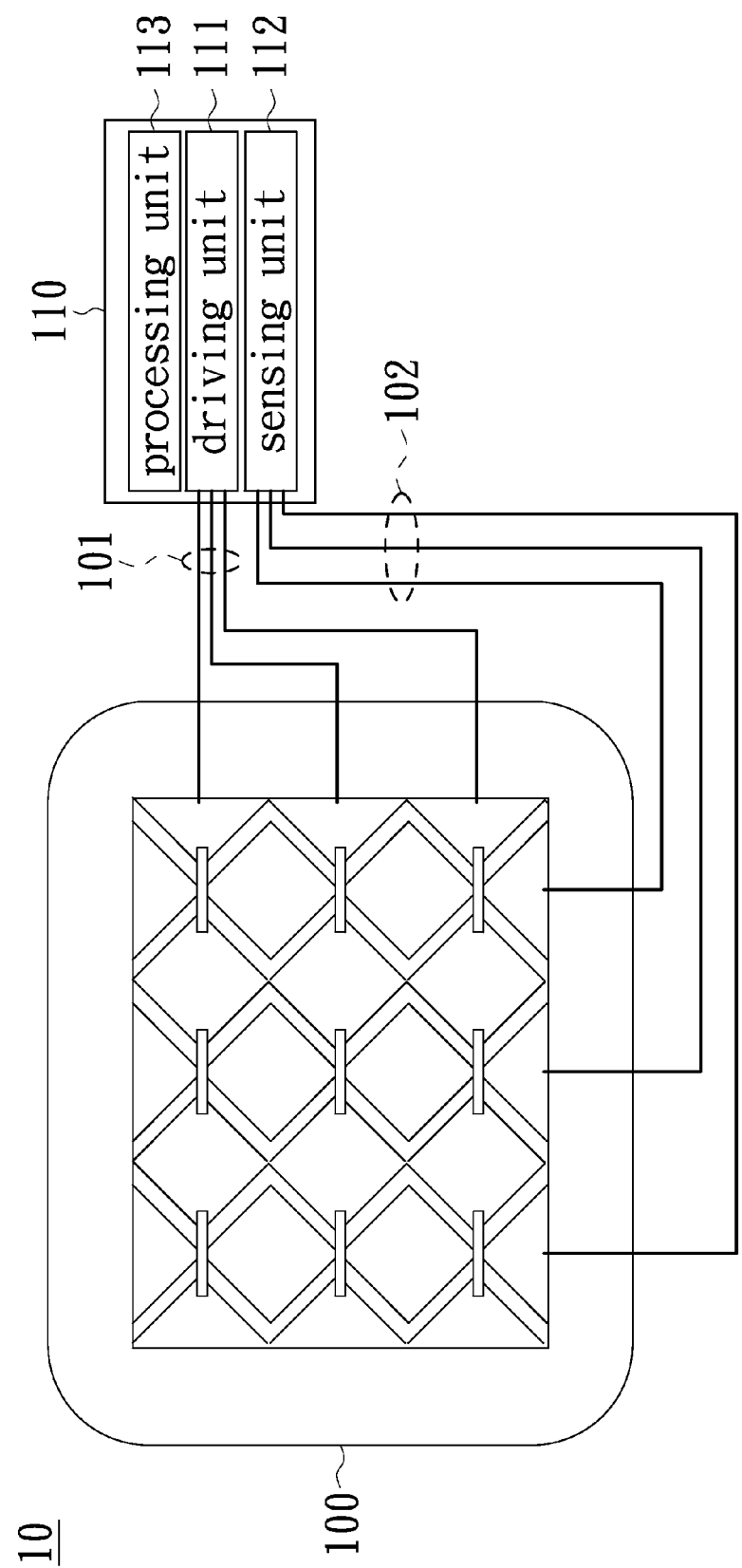
FIG. 1 is a schematic view of a touch apparatus in accordance with an embodiment of the present disclosure.

FIG. 1 is a schematic view of a touch apparatus in accordance with an embodiment of the present disclosure. As shown, the touch apparatus 10 in this embodiment includes a touch panel 100 and a control circuit 110. The touch panel 100 includes a plurality of driving lines 101 and at least one sensing line 102. The control circuit 110, electrically connected to the touch panel 100, includes a driving unit 111, a sensing unit 112 and a processing unit 113. The driving unit 111 is electrically connected to the driving lines 101. The sensing unit 112 is electrically connected to the sensing line(s) 102. The processing unit 113, electrically connected to the driving unit 111 and the sensing unit 112, is configured to drive the touch panel 100 through the driving unit 111 and obtain sensing signals through the sensing unit 112. In addition, the processing unit 113 is further configured to adjust the obtained sensing signal to have a pulse width substantially equal to or multiple of the cycle of an associated noise and thereby suppressing the noise coupled to the touch apparatus 10; wherein the touch apparatus 10 can have a minimum noise interference on the sensing signal thereof if the pulse width of the sensing signal is adjusted to be substantially equal to or multiple of the cycle of the noise. In addition, it is understood that the noise coupled to the touch apparatus 10 may be caused by interferences derived from electrical ballast of a fluorescent tube, power source of the touch panel 100, adapter, extension cord or other external electronic devices (such as mobile phones, hair dryers and microwave ovens), etc. In this embodiment, the touch apparatus 10 is, for example, a capacitive touch apparatus.

Figure 2:
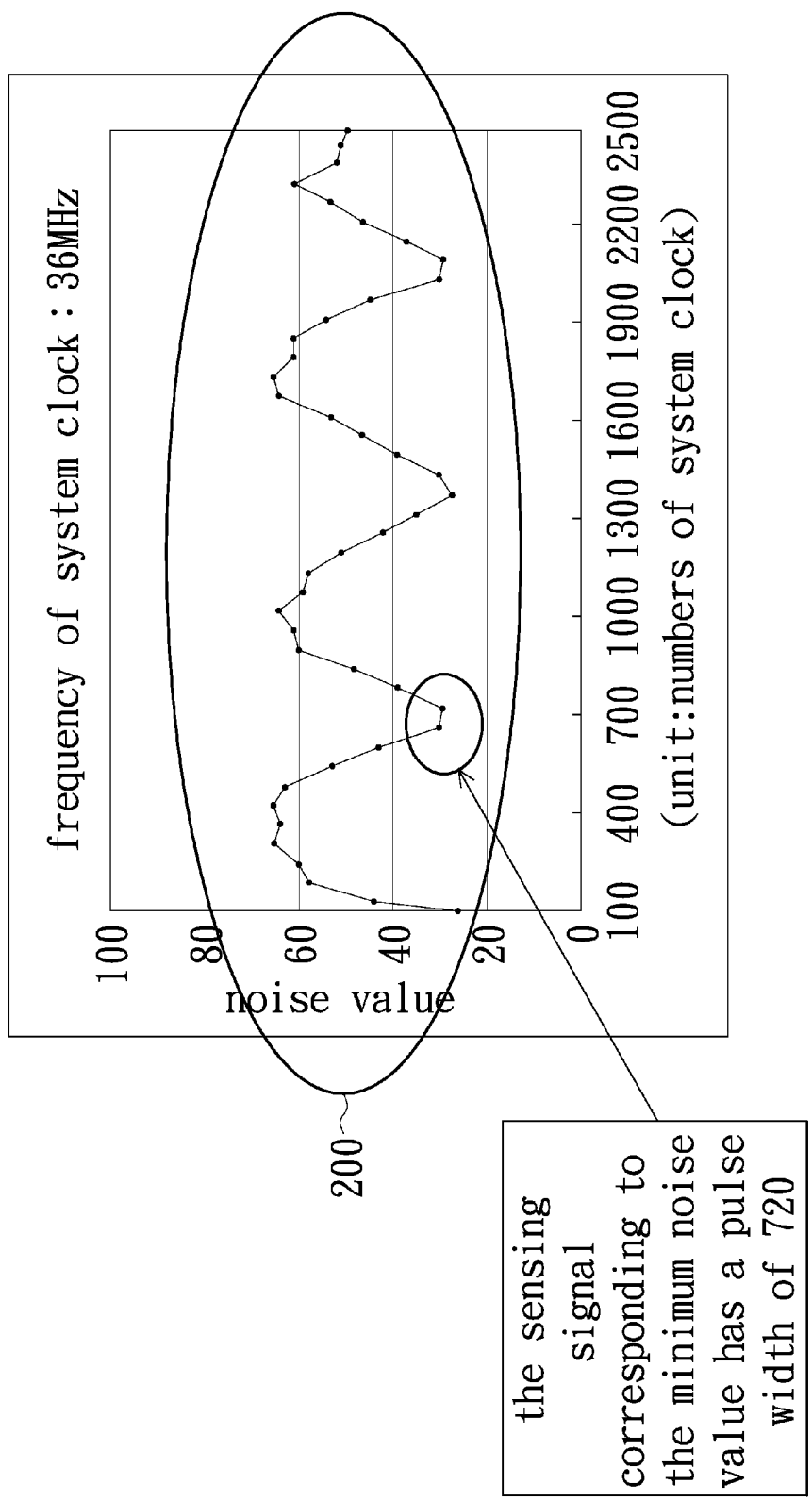
FIG. 2 is a schematic view illustrating an exemplified quantified noise.

The processing unit 113 is further, after the sensing signal being obtained, configured to execute a noise detection operation for a detection of the frequency of the noise. The execution process of the noise detection operation will be described in detail with a reference of FIG. 2, which is a schematic view illustrating an exemplified quantified noise; wherein the noise 200 is the aforementioned noise coupled to the touch apparatus 10. Please refer to both FIGS. 1, 2. In the execution process of the noise detection operation, the processing unit 113 is configured to provide a frequency of system clock (for example, the frequency of system clock is fixed at about 36 MHz), fix the operation frequency band of the sensing signal and adjust the pulse width of the sensing signal as well as sample the noise 200; wherein each pulse width value corresponds to a noise value of the noise 200 as illustrated in FIG. 2. In this embodiment, the noise frequency is obtained from dividing the frequency of system clock by the pulse width of the sensing signal corresponding to the minimum noise value. For example, as illustrated in FIG. 2, the sensing signal, corresponding to the minimum noise value, has a pulse width of about 720, wherein the unit of the pulse width in this embodiment is system clock number; thus, the processing unit 113 obtains the noise frequency (i.e., about 50 KHz) from dividing the frequency of system clock (i.e., about 36 MHz) by the pulse width of the sensing signal (i.e., about 720) (that is, 36 MHz/720=50 KHz). Then, a filtering unit (not shown), once the processing unit 113 obtaining the noise frequency, is configured to execute a noise filtering operation for filtering out the aforementioned noise frequency. In this embodiment, the pulse width of the sensing signal is adjusted from large to small gradually (or, from small to large gradually), while the noise 200 is being sampled by the processing unit 113.

In another embodiment, the noise frequency is obtained from dividing the frequency of system clock by the pulse width of the sensing signal corresponding to the maximum noise value.

Figure 3:
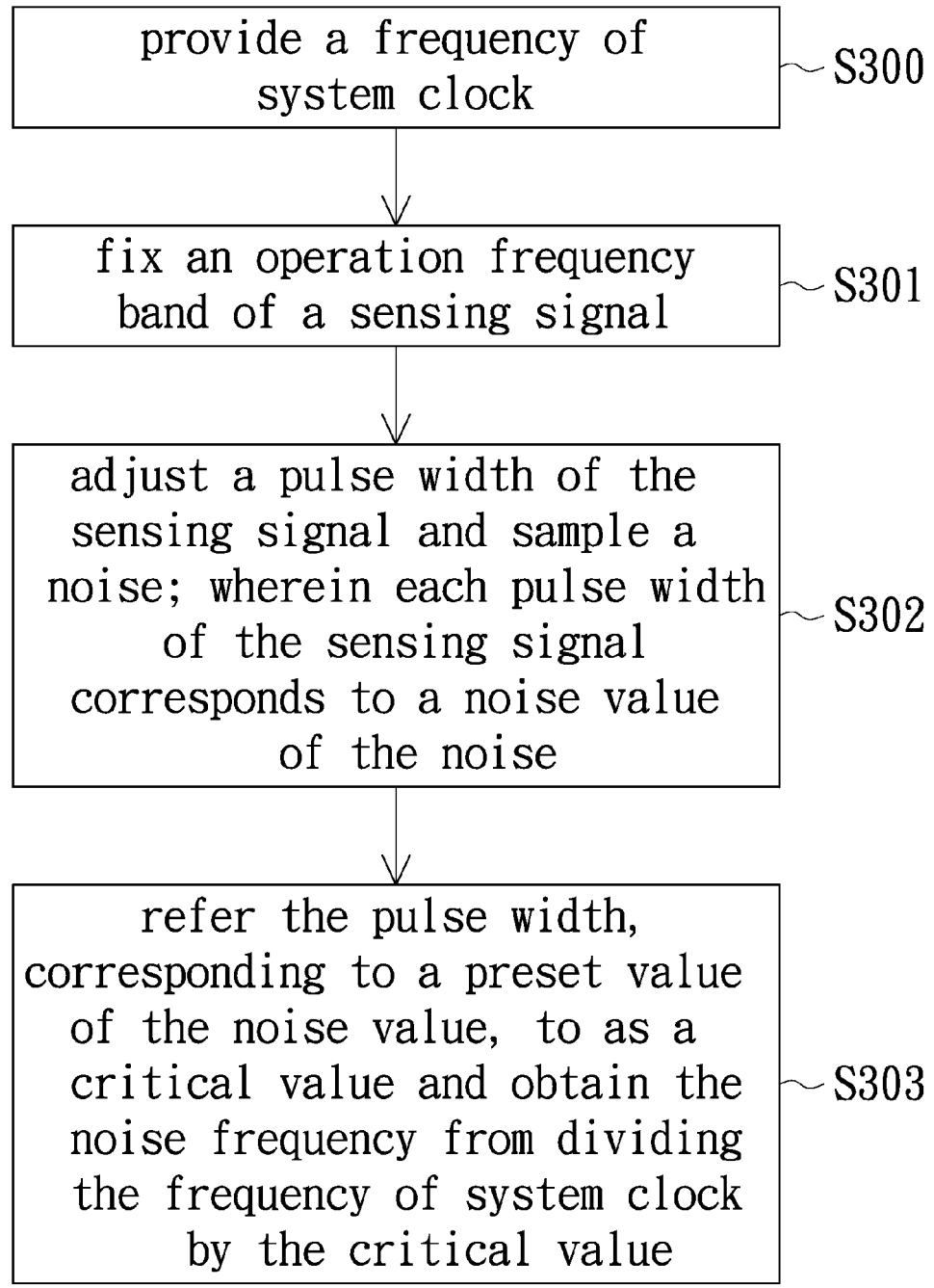
FIG. 3 is a schematic flow chart illustrating a noise frequency detection method in accordance with an embodiment of the present disclosure.

According to the aforementioned description, the noise detection operation can be summarized to have some basic operation steps as illustrated in FIG. 3, which is a schematic flow chart illustrating a noise frequency detection method in accordance with an embodiment of the present disclosure. As shown, the noise frequency detection method in this embodiment includes steps of: first, providing a frequency of system clock (step S300); then fixing the operation frequency band of the sensing signal (step S301); then, adjusting the pulse width of the sensing signal as well as sampling a noise, wherein each pulse width corresponds to a noise value of the noise (step S302); and referring the pulse width, corresponding to a preset value of the noise value, to as a critical value and obtaining the noise frequency from dividing the frequency of system clock by the critical value (step S303); wherein the preset value of the noise value is a minimum noise value of the noise, or, a maximum noise value of the noise.

Figure 4:
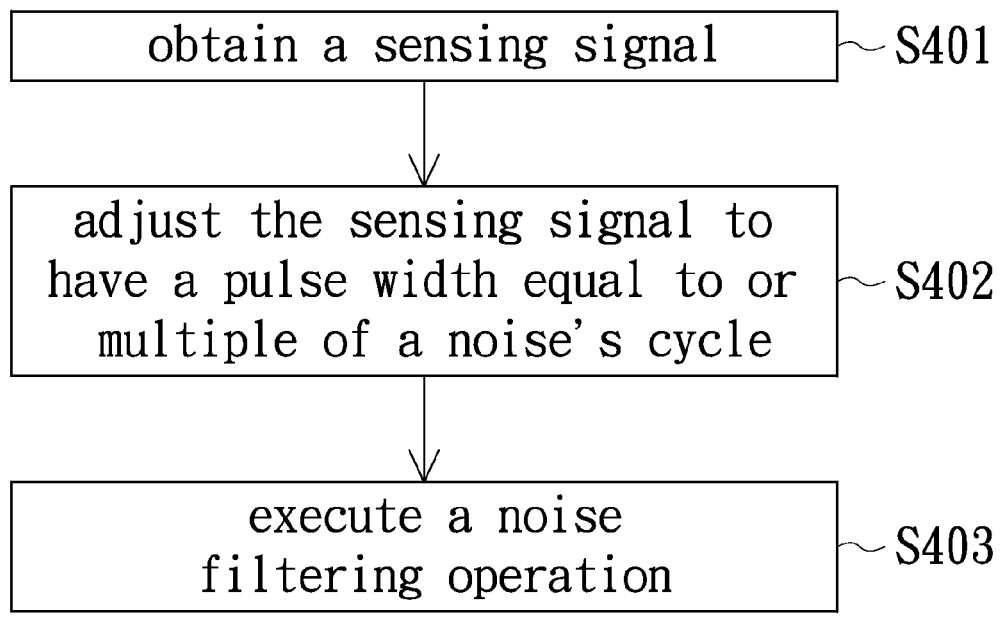
FIG. 4 is a schematic flow chart illustrating a noise suppression method in accordance with an embodiment of the present disclosure.

In addition, according to the aforementioned description, a noise suppression method can be derived from the operation of the touch apparatus 10 as illustrated in FIG. 4, which is a schematic flow chart illustrating a noise suppression method in accordance with an embodiment of the present disclosure. As shown, the noise suppression method includes: obtaining a sensing signal (step S401); adjusting the sensing signal to have a pulse width equal to or multiple of the cycle of a noise (step S402); and executing a noise filtering operation (step S403).

In summary, to fix the noise suppression issue occurring in a conventional touch apparatus, the embodiments of the present disclosure first provide a frequency of system clock, fix the operation frequency band of the sensing signal, and adjust the pulse width of the sensing signal as well as sample a noise; wherein each pulse width corresponds to a noise value of the noise. Then, the embodiments of the present disclosure refer the pulse width, corresponding to a minimum noise value, to as a critical value, obtain the noise frequency from dividing the frequency of system clock by the critical value, and execute a noise filtering operation so as to filter out the noise frequency. Thus, the touch apparatus realized by the aforementioned design features is capable of detecting the noise frequency and consequentially efficiently suppressing the noise coupled to the touch apparatus.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A noise frequency detection method, comprising:
   providing a frequency of system clock;
   fixing an operation frequency band of a sensing signal;
   adjusting a pulse width of the sensing signal and sampling a noise, wherein each pulse width of the sensing signal corresponds to a noise value of the noise; and
   referring the pulse width corresponding to a preset value of the noise to as a critical value, and obtaining a noise frequency from dividing the frequency of system clock by the critical value.

2. The noise frequency detection method according to claim 1, wherein the pulse width of the sensing signal is adjusted from large to small while the noise is being sampled.

3. The noise frequency detection method according to claim 1, wherein the pulse width of the sensing signal is adjusted from small to large while the noise is being sampled.

4. The noise frequency detection method according to claim 1, further comprising executing a noise filtering operation once the noise frequency is obtained.

5. The noise frequency detection method according to claim 4, wherein the noise filtering operation is for filtering out the noise frequency.

6. The noise frequency detection method according to claim 1, wherein the sensing signal has a minimum interference from the noise if the pulse width of the sensing signal is equal to or multiple of a cycle of the noise.

7. The noise frequency detection method according to claim 1, wherein the preset value is a minimum noise value of the noise.

8. The noise frequency detection method according to claim 1, wherein the preset value is a maximum noise value of the noise.

9. The noise frequency detection method according to claim 1, wherein the operation frequency band of the sensing signal is smaller than the frequency of system clock.

10. The noise frequency detection method according to claim 1, wherein the unit of the pulse width is number of system clock.

11. A touch apparatus, comprising:
    a touch panel comprising a plurality of driving lines and at least one sensing line; and
    a control circuit electrically connected to the touch panel and comprising:
    a driving unit electrically connected to the driving lines;
    a sensing unit electrically connected to the at least one sensing line; and
    a processing unit, electrically connected to the driving unit and the sensing unit, configured to obtain a sensing signal through the sensing unit and adjust the obtained sensing signal to have a pulse width equal to or multiple of a cycle of a noise;
    wherein the processing unit is further configured to execute a noise frequency detection operation, the noise frequency detection operation comprises:
    providing a frequency of system clock;
    fixing an operation frequency band of the sensing signal;
    adjusting the pulse width of the sensing signal and sampling the noise, wherein each pulse width of the sensing signal corresponds to a noise value of the noise; and
    referring the pulse width corresponding to a minimum noise value to as a critical value, and obtaining a frequency of the noise from dividing the frequency of system clock by the critical value.

12. The touch apparatus according to claim 11, wherein the pulse width of the sensing signal is adjusted from large to small while the noise is being sampled.

13. The touch apparatus according to claim 11, wherein the pulse width of the sensing signal is adjusted from small to large while the noise is being sampled.

14. The touch apparatus according to claim 11, wherein the sensing signal has a minimum interference from the noise if the pulse width of the sensing signal is equal to or multiple of a cycle of the noise.

15. The touch apparatus according to claim 11, wherein the touch apparatus is a capacitive touch apparatus.

16. The touch apparatus according to claim 11, further comprising:

a filtering unit configured to filter out the noise.

17. The touch apparatus according to claim 11, wherein the operation frequency band of the sensing signal is smaller than the frequency of system clock.

18. The touch apparatus according to claim 11, wherein the unit of the pulse width is number of system clock.

* * * * *